United States Patent

Kiuchi et al.

[11] Patent Number: 5,907,988
[45] Date of Patent: Jun. 1, 1999

[54] WIRE SAW APPARATUS

[75] Inventors: Etsuo Kiuchi, Gunma-gun; Kazuo Hayakawa, Takasaki; Kouhei Toyama, Nishi-shirakawa-gun, all of Japan

[73] Assignee: Shin-Etsu Handotai Co., Ltd., Tokyo, Japan

[21] Appl. No.: 08/903,759

[22] Filed: Jul. 31, 1997

Related U.S. Application Data

[63] Continuation of application No. 08/500,840, Jul. 11, 1995, abandoned.

[30] Foreign Application Priority Data

Jul. 29, 1994 [JP] Japan ................................. 6-197426

[51] Int. Cl.⁶ ............................... B26D 1/44; B28D 1/06
[52] U.S. Cl. ........................................ 83/651.1; 125/16.01
[58] Field of Search ........................ 83/651.1; 125/16.01, 125/16.02, 14, 21, 17

[56] References Cited

U.S. PATENT DOCUMENTS

| 2,702,538 | 2/1955 | Burkhardt | 125/21 |
| 3,841,297 | 10/1974 | Mech | 125/21 |
| 5,052,366 | 10/1991 | Matsukura | 83/651.1 |
| 5,060,628 | 10/1991 | Ishida . | |

FOREIGN PATENT DOCUMENTS

| 0593899 | 4/1994 | European Pat. Off. . | |
| 61-293766 | 12/1986 | Japan . | |
| 1-234153 | 9/1989 | Japan | 83/651.1 |
| 1-316163 | 12/1989 | Japan . | |
| 1415240 | 11/1975 | United Kingdom . | |

OTHER PUBLICATIONS

Patent Abstracts of Japan, vol. 14, No. 119 (M–945), Mar. 6, 1990.

Patent Abstracts of Japan, vol. 11, No. 160 (M–592), May 23, 1987.

*Primary Examiner*—M. Rachuba
*Assistant Examiner*—Sean A. Pryor
*Attorney, Agent, or Firm*—Oliff & Berridge, PLC

[57] ABSTRACT

A wire saw apparatus which is less susceptible to loosening of the wire and to breakage thereof, includes a wire supply spool, a cutting head having a plurality of main rollers around which a wire from the wire supply spool is wrapped, a wire take-up spool for taking-up the wire from the cutting head, and a plurality of guide rollers for guiding the wire which are arranged between the wire supply spool and the cutting head and between the cutting head and the wire take-up spool, wherein each of the guide rollers has a peripheral groove having a square-shaped section with a width of 2–20 times the diameter of the wire, and the number of turns of the wire which is wrapped around each guide roller in the groove having a square-shaped section is not less than 1 and not more than 5.

10 Claims, 4 Drawing Sheets

WIRE SAW APPARATUS

This is a continuation of application Ser. No. 08/500,840 filed Jul. 11, 1995 now abandoned.

BACKGROUND OF THE INVENTION

1. Field of the Invention

The present invention relates to a wire saw apparatus for sawing or cutting an article to be processed, hereinafter referred to a work simply, e.g., a brittle material such as a semiconductor material, a magnetic material, quartz, ceramic or the like, into a plurality of slices.

2. Description of Related Art

In recent years, in order to manufacture a large number of wafer-like pieces by cutting a work having a large diameter, a wire saw apparatus has been used. An example thereof is illustrated in FIG. 5. In this Figure, the wire saw apparatus 1 comprises a wire supply spool 3 for supplying a cutting wire 2, a cutting head 5 for cutting a work 4 by using the cutting wire 2, and a wire take-up spool 6 for taking-up the cutting wire 2. In the wire saw apparatus 1, a plurality of guide rollers 7, 7, . . . for guiding the cutting wire 2 and for giving a predetermined tension to the cutting wire 2 are arranged between the wire supply spool 3 and the cutting head 5 and between the cutting head 5 and the wire take-up spool 6. The cutting head 5 comprises three main rollers 5a, 5b, and 5c. In the wire saw apparatus 1, the work 4 is sawed or cut by pushing the work 4 against a plurality of lines of cutting wire 2 which is wrapped around the main rollers 5a, 5b, and 5c of the cutting head 5 in a spiral configuration, and by supplying an abrasive slurry containing abrasive grains into between the work 4 and the lines of cutting wire 2, while complex action of the cutting wire 2 which comprises back and forth action in the direction of the lines and feeding action, is taken.

In such a conventional wire saw apparatus, the wrapping angle of portions of the cutting wire 2, which is wrapped around a guide roller 7 and are in contact with the guide rollers 7, is only about 180° at the most. Because of such a small wrapping angle of the cutting wire 2, the wire 2 is apt to become loose while cutting the work 4. As a result, a stress concentration is apt to occur in a portion of the wire 2, so that a breakage of the wire 2 occurs. When such a breakage of the wire occurs, work for stretching the cutting wire 2 again is required. There is a problem that such work for re-stretching of the wire is laborious and requires a long time.

Each guide roller 7 has a groove 9 having a V-shaped section, which may be hereinafter simply referred to a V-shaped groove, on the peripheral surface thereof, as shown in FIG. 6. Therefore, the cutting wire 2 in the groove 9 is seated on the bottom of the groove 9 when some tension is applied to the wire 2. However, when the cutting wire 2 comes loose, the wire 2 rolls and moves in the V-shaped groove 9, so that partial wear is produced on the wall surface of the groove. When such partial wear is produced, replacement of the guide roller 7 is required. Because the replacement work includes work for stretching the cutting wire 2 again and the like, there is a problem that the work is laborious and requires a long time. Some known wire saw apparatuses adopt guide rollers 7a or 7b each of which has one or more spare peripheral grooves 9a with a V-shaped section, as shown in FIGS. 7 and 8. Such a type of wire saw apparatus having such guide rollers 7a or 7b with spare peripheral grooves 9a, has the disadvantages of requiring higher manufacturing costs and of being large-sized.

SUMMARY OF THE INVENTION

The present invention was developed in view of such problems. An object of the present invention is to provide a wire saw apparatus having a roller with a long life. Another object of the present invention is to provide a wire saw apparatus which is less susceptible to loosening of the wire and to breakage thereof.

In accordance with one aspect of the present invention, the wire saw apparatus comprises; a wire supply member, a cutting head having a plurality of main rollers around which a cutting wire from the wire supply member is wrapped, a wire take-up member for taking-up the cutting wire from the cutting head, and a plurality of guide rollers for guiding the cutting wire which are arranged between the wire supply member and the cutting head and between the cutting head and the wire take-up member, wherein at least one roller of the main rollers and the guide rollers has a groove with a square-shaped section, hereinafter, which may be simply referred to a square-shaped groove, on the peripheral surface thereof.

According to such a wire saw apparatus comprising rollers each having a peripheral square-shaped groove, it is possible to reduce partial wear on the side wall surface of the groove and therefore to extend the roller life.

Preferably, the peripheral square-shaped groove has a width of 2–20 times the diameter of the wire. The wire is wrapped around the roller in the peripheral groove with a square-shaped section, and the number of turns of the wrapped wire in the peripheral square-shaped groove is preferably not less than 1 and not more than 5. The width of the groove with a square-shaped section may be in the range of 0.3–5 mm.

According to the wire saw apparatus comprising a roller which has a such structure, the cutting wire is hard to come loose while cutting a work by the wire and a stress concentration is hard to occur in a portion of the wire. Consequently, a breakage of the cutting wire is hard to happen.

In accordance with another aspect of the present invention, the wire saw apparatus comprises; a wire supply member, a cutting head having a plurality of main rollers around which a wire from the wire supply member is wrapped, a wire take-up member for taking-up the wire from the cutting head, and a plurality of guide rollers for guiding the wire which are arranged between the wire supply member and the cutting head and between the cutting head and the wire take-up member, wherein each of the guide rollers has a peripheral groove with a square-shaped section which has a width of 2–20 times the diameter of the wire, and the number of turns of the wire which is wrapped around each guide roller is not less than 1 and not more than 5.

According to the wire saw apparatus comprising a roller which has a such structure, it is possible to extremely lessen looseness of the cutting wire while cutting a work by the wire and a stress concentration is very hard to occur in a portion of the wire. Consequently, a breakage of the cutting wire is very hard to happen.

Preferably, the main roller around which the cutting wire from the wire supply member is wrapped at first, has the peripheral square-shaped groove. The peripheral groove around which the wire is wrapped at first, of the main roller which the wire is wrapped at first, is preferably the one having a square-shaped section.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENT OF THE INVENTION

Hereinafter, a preferred embodiment of the wire saw apparatus according to the present invention will be explained with reference to the drawings.

Figure 1:
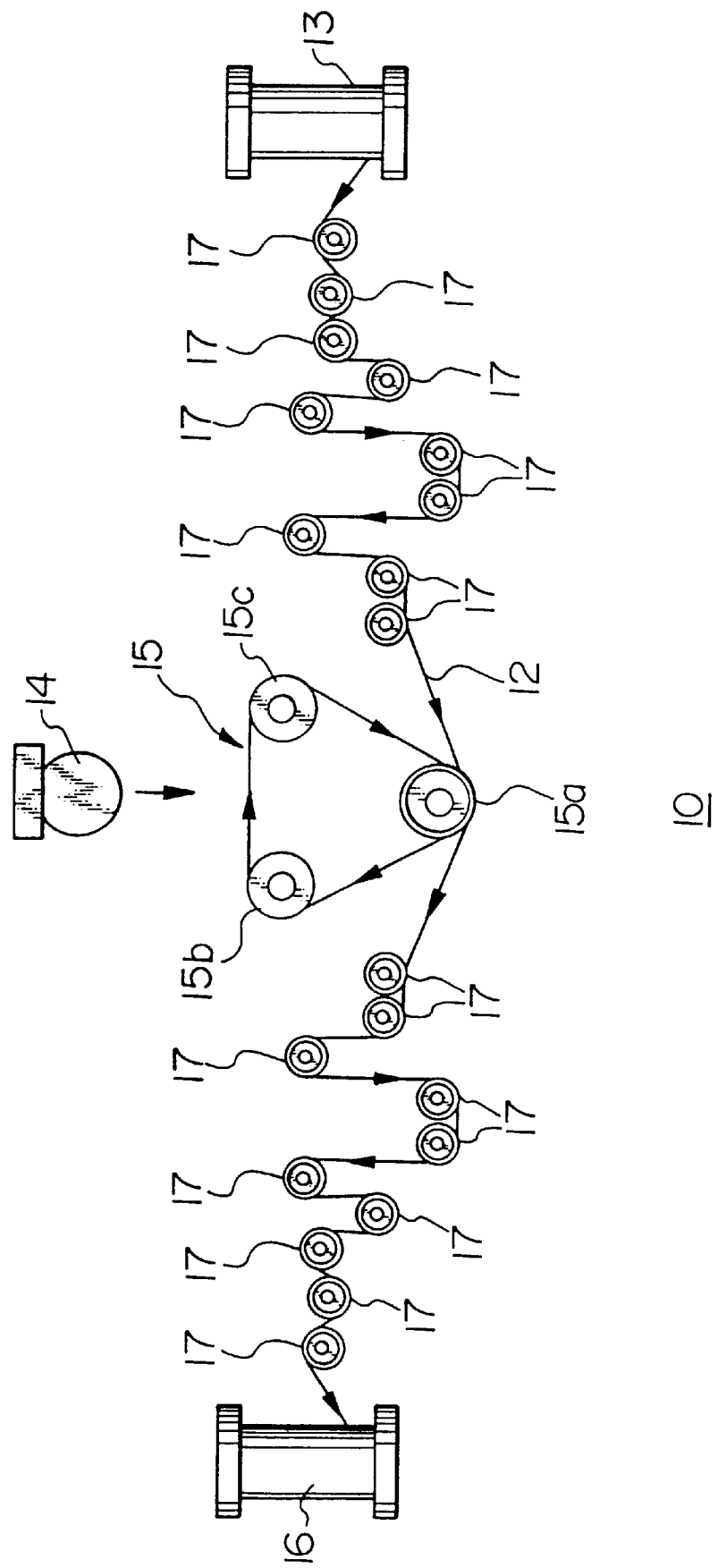
FIG. 1 is a view illustrating a structure of a wire saw apparatus according to an embodiment of the present invention.

FIG. 1 shows a wire saw apparatus according to an embodiment of the present invention. The wire saw apparatus 10 comprises a wire supply spool (wire supply member) 13 for supplying a cutting wire 12, a cutting head 15 for cutting a work 14 by using the cutting wire 12, and a wire take-up spool (wire take-up member) 16 for taking-up the cutting wire 12. In the wire saw apparatus 10, a plurality of guide rollers 17, 17, . . . for guiding the cutting wire 12 and for giving a predetermined tension to the cutting wire 12 are arranged between the wire supply spool 13 and the cutting head 15 and between the cutting head 15 and the wire take-up spool 16. The cutting head 15 comprises three main rollers 15a, 15b, and 15c. In the wire saw apparatus 10, the work 14 is cut by pushing the work 14 against a plurality of lines of the cutting wire 12 which are wrapped around the main rollers 15a, 15b, and 15c of the cutting head 15 in a spiral configuration, and by supplying an abrasive slurry containing abrasive grains in between the work 14 and the lines of the cutting wire 12, while complex action of the cutting wire 12 which comprises back and forth action in the direction of the line and feeding action, is taken. The three main rollers 15a, 15b, and 15c which form the cutting head 15, and the plurality of guide rollers 17, 17, . . . have structures as follows.

Figure 2:
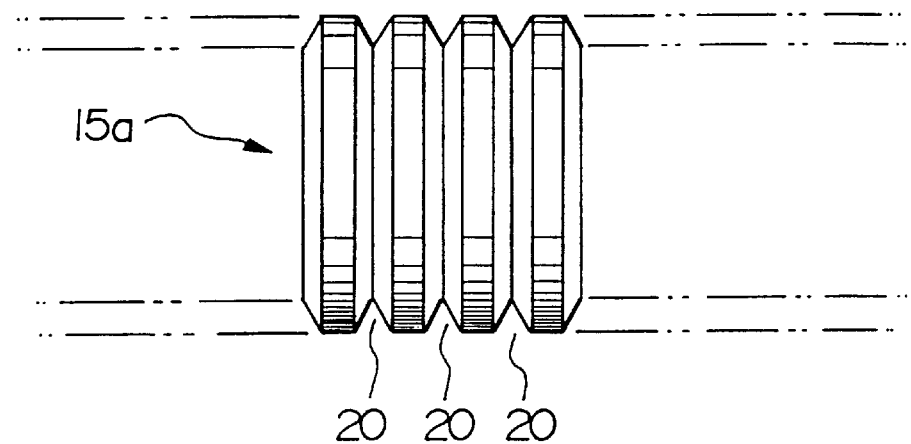
FIG. 2 is a view illustrating a portion of a main roller in the wire saw apparatus shown in FIG. 1.
Figure 3:
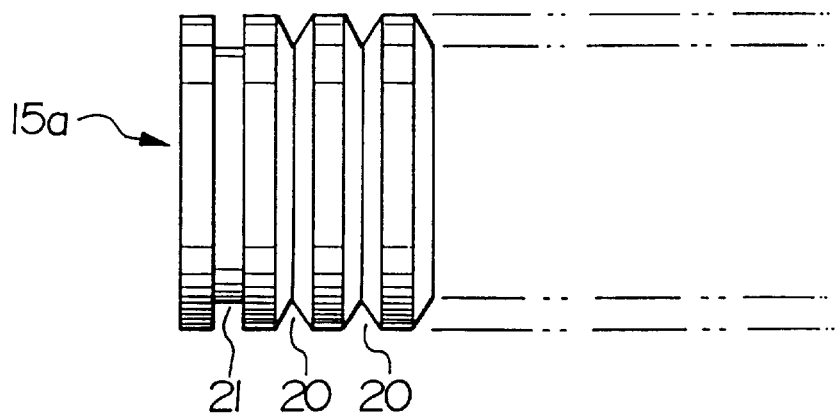
FIG. 3 is a view illustrating an end portion of the lower main roller in the wire saw apparatus shown in FIG. 1.

FIG. 2 shows a portion of the main roller 15a. The main roller 15a has a large number of grooves 20 each having a V-shaped section, at regular intervals on the peripheral surface thereof, shown in FIG. 2. Each V-shaped groove 20 accepts one of the plurality of lines of cutting wire 12 and to maintain the plurality of lines of cutting wire in a fixed and parallel configuration. In the lower main roller 15a shown in FIG. 1, i.e., the main roller 15a around which the cutting wire 12 from the wire supply spool 13 is wrapped at first, the groove in which the wire 12 is wrapped at first is the groove 21 having a square-shaped section, as shown in FIG. 3. The square-shaped groove 21 has a width of 2-20 times the diameter of the cutting wire 12, and the wire is wrapped around the roller in the groove with some turns which are not less than 1 turn and not more than 5 turns.

Since the diameter of the cutting wire 12 is generally in the range of 0.14–0.20 mm, a width of 0.3–5 mm is enough for the square-shaped groove 21, in consideration of gaps between wrapped lines of cutting wire 12. The reason for the number of turns of cutting wire 12 in the square-shaped groove being not more than 5 is that turns more than 5 not only cannot be expected to give larger effects but also make the wrapping work laborious and requires a large-sized main roller 15a.

Figure 4:
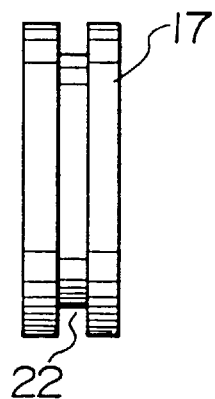
FIG. 4 is a view illustrating an embodiment of a guide roller in the wire saw apparatus shown in FIG. 1.
Figure 5:
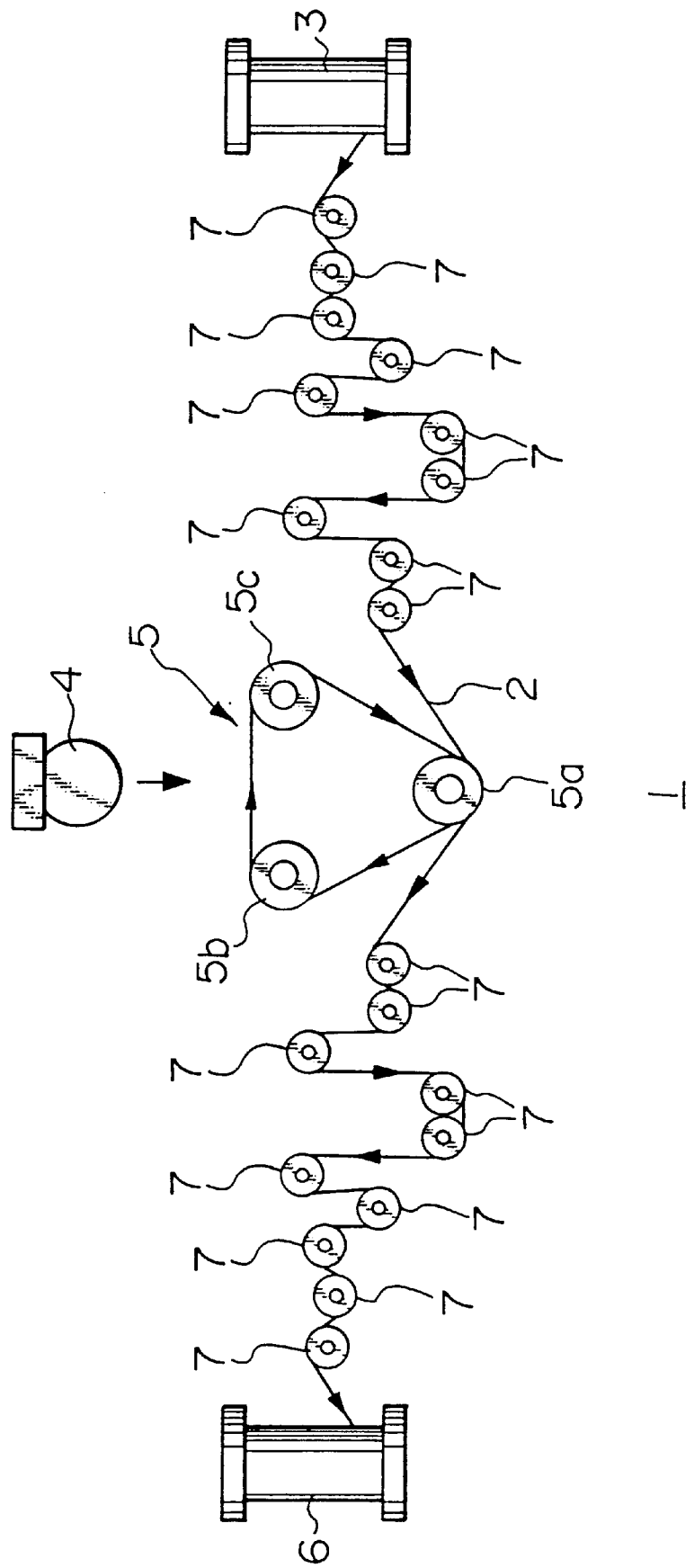
FIG. 5 is a view illustrating an example of a conventional wire saw apparatus.
Figure 6:
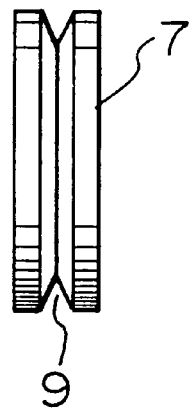
FIG. 6 is a view illustrating an example of a conventional guide roller.
Figure 7:
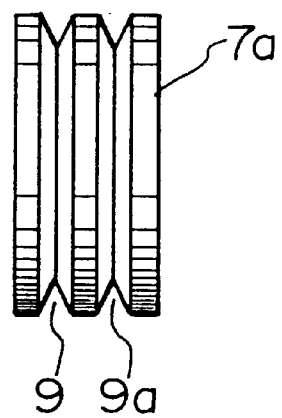
FIG. 7 is a view illustrating another example of a conventional guide roller.
Figure 8:
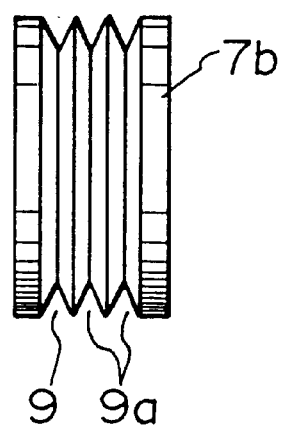
FIG. 8 is a view illustrating a further example of a conventional guide roller.

FIG. 4 shows a guide roller 17. The guide roller 17 also has a groove 22 having a square-shaped section on the peripheral surface thereof. The square-shaped groove 22 has a width not less than double the diameter of the cutting wire 12, and the wire is wrapped around the roller in the groove 22 with some turns which are not less than 1 turn and not more than 5 turns. The width of the square-shaped groove 22 is similar to that of the groove of the main roller 15a.

The wire saw apparatus 10 shown in FIG. 1 is provided with a main roller 15a and guide rollers 17, around which the lines of cutting wire 12 are wrapped in the above-described manner. In the FIG. 1, the lower main roller 15a and the guide rollers 17 which are illustrated by triple concentric circles are the rollers around which the cutting wire 12 is wrapped in the square-shaped groove with some turns which are not less than 1 turn and not more than 5 turns.

Next, the function and effects of the wire saw apparatus 10 having such a structure will be explained. Because the cutting wire is wrapped around the main roller 15a in the square-shaped groove 21 and around the guide rollers 17 in the square-shaped groove 22, with some turns which are not less than one turn, the wire 12 is hard to come loose and a stress concentration is hard to occur in a portion of the wire 12, so that a breakage of cutting wire 12 is hard to happen. Consequently, it is possible to extremely reduce works for stretching the cutting wire 12 again due to breakage of the wire 12 and to effectively carry out a cutting operation for the work 14.

Because each guide roller 17 has the peripheral square-shaped groove 22 and the side walls in the groove 22 is approximately perpendicular to the bottom surface, even if the cutting wire 12 comes somewhat loose, it is possible to prevent partial wear on the side wall in the groove and consequently to extend the life of the guide roller 17. Therefore, it is possible to reduce works for stretching the cutting wire 12 again due to exchange of the guide roller 17 and to effectively carry out a cutting operation for the work 14.

Although the present invention has been described in its preferred form with a certain degree of particularity, it should also be understood that the present invention is not limited to the preferred embodiment and that various changes and modifications may be made to the invention without departing from the spirit and scope thereof.

In the above-described embodiment, a peripheral square-shaped groove 21 is formed in also the lower main roller 15a. However, such a groove 21 with a square-shaped section may be formed in the main roller 15a because the effects of the sent invention can be obtained by only the guide rollers h having a peripheral square-shaped groove 22. It is a matter of course that if a peripheral square-shaped groove 21 formed in also the lower main roller 15a, the cutting wire is hard to come loose furthermore.

What is claimed is:

1. A wire saw apparatus comprising:
   a wire supply member;
   a cutting head for cutting a work by using a wire, the cutting head including a plurality of main rollers around which the wire from the wire supply member is wrapped, each of the main rollers having a plurality of grooves at predetermined intervals on a peripheral surface thereof, each of the grooves accepting one of a plurality of lines of the wire;

a wire take-up member for taking-up the wire from the cutting head; and a plurality of guide rollers for guiding the wire which are arranged between the wire supply member and the cutting head and between the cutting head and the wire take-up member;

wherein at least one roller of the main rollers of the cutting head, around which the wire from the wire supply member is first wrapped in the cutting head, has a groove of the plurality of grooves with a square-shaped section on the peripheral surface thereof, the wire from the wire supply member being first wrapped around the groove with the square-shaped section.

2. A wire saw apparatus as claimed in claim 1, wherein the groove with a square-shaped section of the main roller has a width of 2–20 times the diameter of the wire.

3. A wire saw apparatus as claimed in claim 1; wherein the number of turns of the wrapped wire in the groove with a square-shaped section of the main roller is not less than 1 and not more than 5.

4. A wire saw apparatus as claimed in claim 1; wherein the groove with a square-shaped section of the main roller has a width of 2–20 times the diameter of the wire, and the number of turns of the wrapped wire in the groove with a square-shaped section of the main roller is not less than 1 and not more than 5.

5. A wire saw apparatus comprising:

a wire supply member;

a cutting head for cutting a work by using a wire, which comprises a plurality of main rollers around which the wire from the wire supply member is wrapped, wherein each of the main rollers has a plurality of grooves at predetermined intervals on the peripheral surface thereof which accepts one of a plurality of lines of the wire;

a wire take-up member for taking-up the wire from the cutting head; and a plurality of guide rollers for guiding the wire, which are arranged between the wire supply member and the cutting head and between the cutting head and the wire take-up member;

wherein a main roller of the cutting head, around which a wire from the wire supply member is first wrapped, has a groove with a square-shaped section the, wire being wrapped first around the groove with the square-shaped section, and each of the guide rollers has a peripheral groove with a square-shaped section which has a width of 2–20 times the diameter of the wire, and the number of turns of the wire wrapped around each guide roller is not less than 1 and not more than 5.

6. A wire saw apparatus comprising:

a wire supply member;

a cutting head for cutting a work by using a wire, the cutting head including a plurality of main rollers around which a wire from the wire supply member is wrapped, each of the main rollers having a plurality of grooves at predetermined intervals on a peripheral surface thereof, each of the grooves accepting one of a plurality of lines of the wire;

a wire take-up member for taking-up the wire from the cutting head; and a plurality of guide rollers for guiding the wire which are arranged between the wire supply member and the cutting head and between the cutting head and the wire take-up member;

wherein each of the guide rollers has a peripheral groove with a square-shaped section which has a width of 2–20 times the diameter of the wire, and the number of turns of the wire which is wrapped around each guide roller is not less than 1 and not more than 5.

7. A wire saw apparatus as claimed in claim 6, wherein the width of the groove with a square-shaped section is in the range of 0.3–5 mm.

8. A wire saw apparatus as claimed in claim 6, wherein the main roller around which the wire from the wire supply member is wrapped at first, also has a groove with a square-shaped section and the groove around which the wire is wrapped at first, of the main roller which the wire is wrapped at first, is the one having a square-shaped section.

9. A wire saw apparatus as claimed in claim 8; wherein the groove with a square-shaped section of the main roller has a width of 2–20 times the diameter of the wire, and the number of turns of the wrapped wire in the groove with a square-shaped section of the main roller is not less than 1 and not more than 5.

10. A wire saw apparatus as claimed in claim 9, wherein the width of the groove with a square-shaped section is in the range of 0.3–5 mm.

* * * * *